US007349962B2

(12) United States Patent
Miller et al.

(10) Patent No.: US 7,349,962 B2
(45) Date of Patent: Mar. 25, 2008

(54) SIGNALING METHOD FOR LINE TERMINAL EQUIPMENT HEALTH AND STATUS

(75) Inventors: Karl E. Miller, Chandler, AZ (US); Joel L. Gross, Gilbert, AZ (US); Gregory C. Ladden, Vernon Hills, IL (US); Stephen S. Sawyer, Lake Zurich, IL (US)

(73) Assignee: Motorola, Inc., Schaumburg, IL (US)

( * ) Notice: Subject to any disclaimer, the term of this patent is extended or adjusted under 35 U.S.C. 154(b) by 1021 days.

(21) Appl. No.: 10/633,281

(22) Filed: Jul. 31, 2003

(65) Prior Publication Data

US 2005/0027856 A1    Feb. 3, 2005

(51) Int. Cl.
*G06F 15/173*    (2006.01)
*G06F 11/00*    (2006.01)
*H04L 12/28*    (2006.01)

(52) U.S. Cl. .................. 709/224; 370/242; 370/260; 714/47

(58) Field of Classification Search ............. None
See application file for complete search history.

(56) References Cited

U.S. PATENT DOCUMENTS

| 5,073,774 | A | * | 12/1991 | Ikawa .................. 340/825.01 |
| 5,555,372 | A | * | 9/1996 | Tetreault et al. ............. 714/15 |
| 5,839,064 | A | * | 11/1998 | Foti .......................... 455/413 |
| 5,991,276 | A | * | 11/1999 | Yamamoto ................ 370/260 |
| 6,141,326 | A | * | 10/2000 | Minami ..................... 370/244 |
| 6,219,336 | B1 | * | 4/2001 | Takahashi et al. ......... 370/223 |
| 6,359,858 | B1 | * | 3/2002 | Smith et al. ............... 370/217 |
| 7,130,275 | B2 | * | 10/2006 | Gross et al. ............... 370/242 |

\* cited by examiner

*Primary Examiner*—Wen-Tai Lin

(57) ABSTRACT

Line terminal equipment (30, 35) transmits health and status information (66, 68) to bearer payload processors (50-N). Each bearer payload processor (50-N) concatenates (96) the health and status information of the line terminal equipment. Each bearer payload processor transmits the concatenated health and status information including bearer traffic to each of the line terminal equipment (30, 35). Both the line terminal equipment and bearer payload processors compare (98, 100) the health and status information.

10 Claims, 2 Drawing Sheets

SIGNALING METHOD FOR LINE TERMINAL EQUIPMENT HEALTH AND STATUS

BACKGROUND OF THE INVENTION

The present invention pertains to communication system failures and more particularly to automatic protection switching in such communication systems.

Communication system traffic is routed to a central point to perform the data transfer and switching functions. This central point is a mobile switching center. The mobile switching center is typically coupled to a digital cross connect switch on E1 or T1 links. The digital cross connect switch aggregates multiple T1/E1 interfaces to the optical SONET/SDH interfaces terminating at the network element. These features may be embedded into a single product which is sold by mobile switching system manufacturers.

Typically line equipment is coupled to the digital cross connect switch via OC3 links. These OC3 links may run considerable distances, for example.

All too frequently, these lines or fiber connections are severed by backhoes or other digging equipment and are covered by automatic protection switching standards. Automatic protection switching standards have been implemented into communication systems in order to alleviate the problems with failures due to lines being severed. Today's competitive markets demand that communication systems provide near continuous functionality. Therefore it is imperative that 99.999 percent of the time that the communication system smoothly handle data transmission.

When line terminal equipment fails down stream processing equipment will lose functionality until a number of failures occur. Typically, after a number of failures occur in each of the down stream payload processors, some sort of switch over from a working line terminal equipment to a protection line terminal equipment is made by the system. Typically there are a great many payload processors coupled to each line terminal equipment. When line terminal equipment fails, each communication payload processor will incur a number of faults before any kind of system fault detection and resolution occurs. Errors and faults will "pile up" for each of the down stream payload processors. In addition, the line termination equipment itself may fail.

The above scenario suffers from a detection process which is relatively slow. In addition, the down stream payload processors must wait for some indication of what alternative data routing they must perform in order to circumvent the errors and faults.

Accordingly, it would be highly desirable to have an arrangement to provide rapid seamless protection arrangement for faults due to line termination equipment failure.

DESCRIPTION OF THE PREFERRED EMBODIMENT OF THE INVENTION

Figure 1:
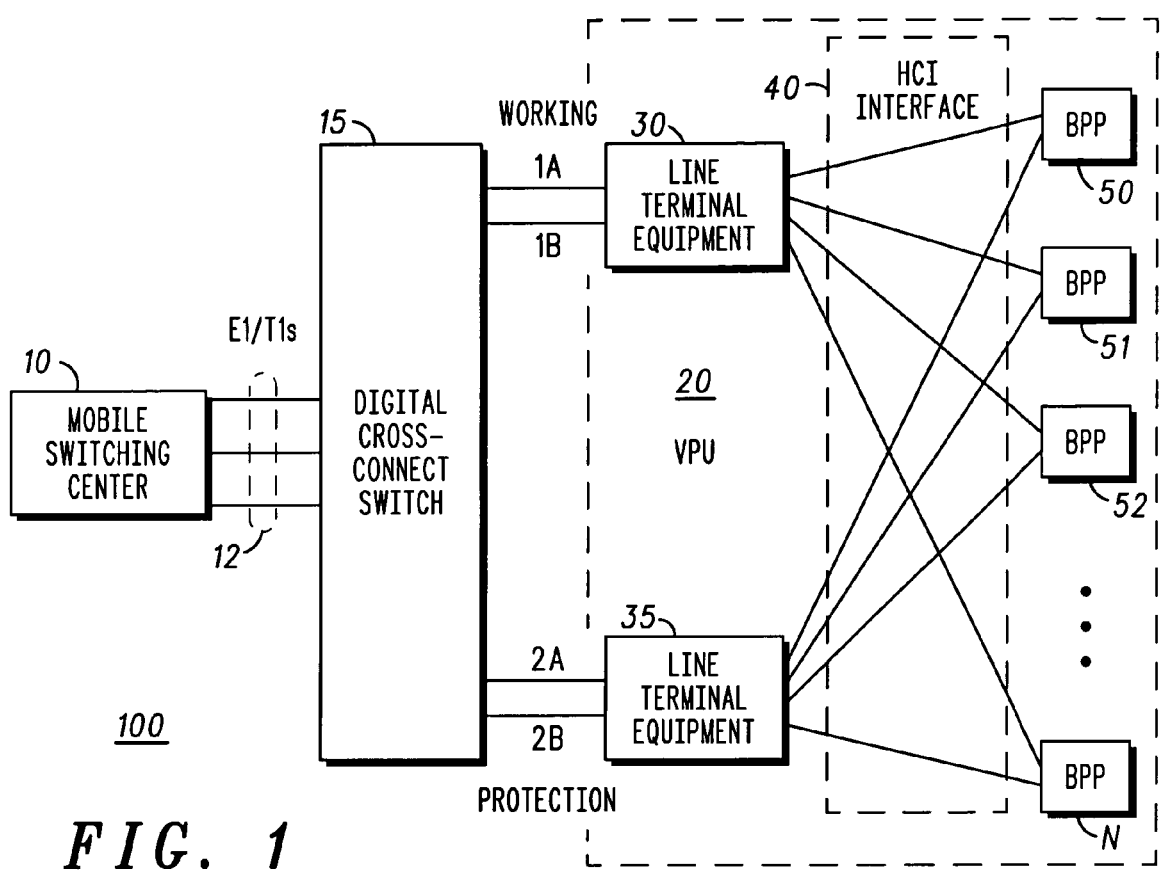
FIG. 1 is a block diagram of a communication system in accordance with the present invention.

Referring to FIG. 1, a block diagram of a communication system 100 embodying an automatic protection switching arrangement is shown. Mobile switching center 10 of communication system 100 is coupled via a number of E1 or T1 links to a digital cross connect switch 15. Voice processing unit (VPU) 20 handles the conversion and transmission of all incoming and outgoing bearer traffic to the mobile switching center 10. Voice processing unit 20 is coupled to digital cross connect switch (DCS) 15 via two pairs of links or fiber connections. In the example shown in FIG. 1, a Sonet/SDH network element is the VPU 20 which includes two line terminal equipments 30 and 35. In other automatic protection switching arrangements, each line equipment may be coupled to the DCS by a working link and a protection link. That is, line terminal equipment 30 is coupled to DSC 15 via link 1A and 2A. As a result, while protecting against a fiber failure, if the line terminal equipment 30 failed, both working and protection links would be lost with corresponding bearer data. A Here, working OC3 links 1A and 1B have been grouped to handle bearer traffic for normal operation of the system. That is working OC3 links 1A and 1B are now employed to couple data transmission between line terminal equipment 30 and DCS 15. Four automatic protection switching OC3 links 1A, 1B, 2A and 2B are coupled line terminal equipment 35 to DCS 15. Both working link 1A and protection link 2A receive the same bearer traffic. Similarly, working OC3 link 1B and protection OC3 link 2B receive the same bearer traffic.

Each OC-3 compatible line terminal equipment 30 and 35 may handle up to 2016 channels of bearer traffic on 1A and another 2016 channels on 1B. Each line terminal equipment may have multiple banks (1A-1B). Bearer payload processors 50, 51, 52 through N receive and transmit bearer traffic from base stations and other telecommunication equipment. Each bearer payload processor (BPP) 50, for example, is coupled to both line terminal equipment 30 and to line terminal equipment 35. Each BPP 50 transmits the same stream of bearer traffic to line terminal equipments 30 and 35. Each line terminal equipment inhibits downstream BPPs from regarding the protection OC3 links 2A and 2B from DCS 15. Normal operations involve BPPs regarding only data forwarded from the working line terminal equipment interface.

Since working OC3 link 1A and protection OC3 link 2A connect different line terminal equipments 30 and 35 respectively to the DCS, a single failure will not remove both the working and protection link. In general, the working link 1A and protection link 2A are both capable of transmitting the same data through the DCS 15 to the mobile switching center 10.

The working OC3 link and protection OC3 link (1A and 2A) are split to different line terminal equipments 30 and 35.

This not only provides for fault recovery of a cut OC3 link but provides for recovery for a fault in the line terminal equipment. Further, since each bearer payload processor 50-N is cross coupled to both line terminal equipments 30 and 35 via a High-speed Circuit Interface (HCI) interface 40, any OC3 link failures and line terminal equipment failures are detected and the faulty units switched out of service; and the arrangement will detect interface faults in the HCI interface and the bearer payload processors.

Thus, the automatic protection switching has working OC3 links on separate line terminal equipments from protection OC3 links. When a cut in the OC3 link cable is detected the system will automatically route bearer traffic from link 1A to link 2A, for example.

Figure 2:
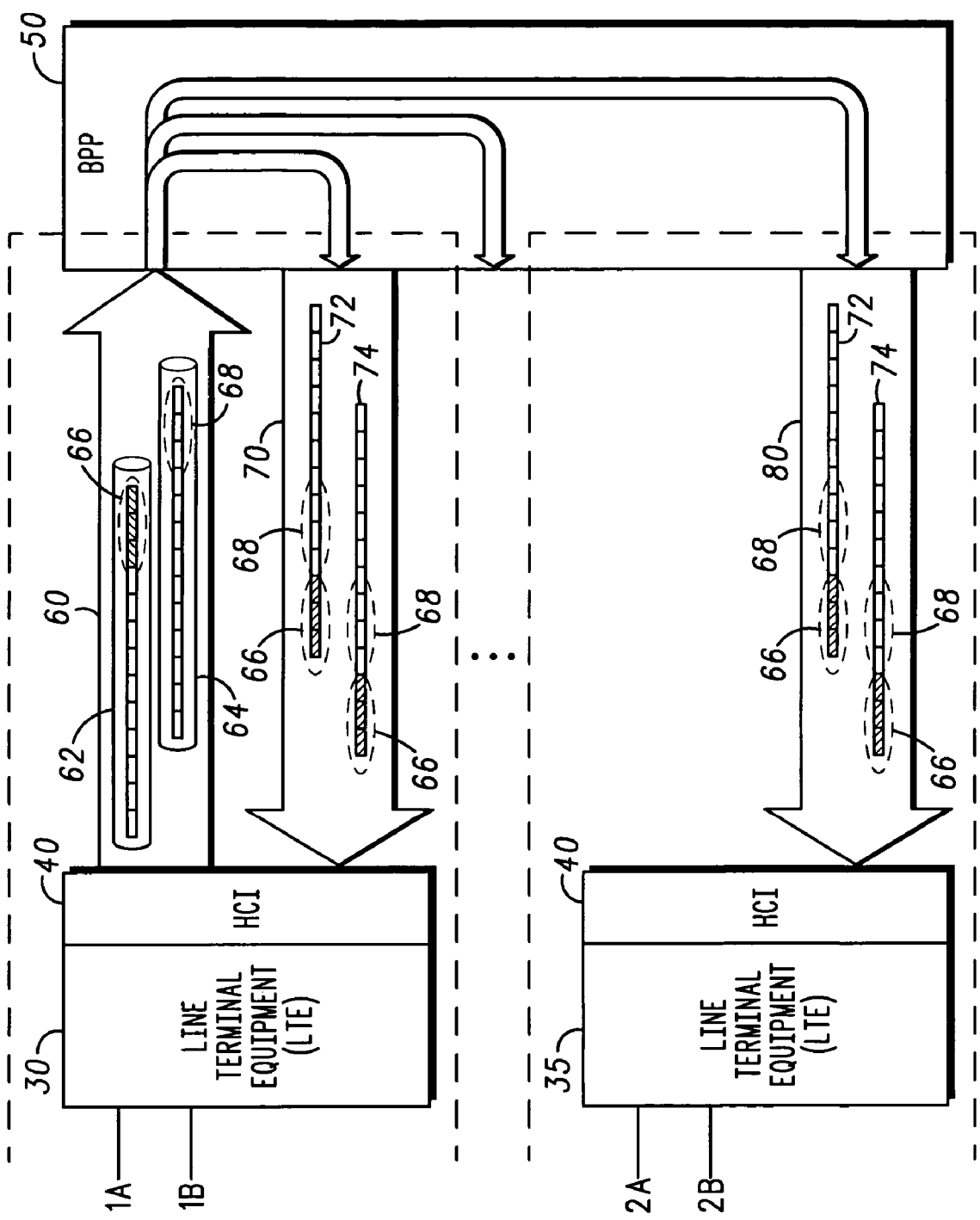
FIG. 2 is a block diagram of a signaling method for line equipment states in accordance with the present invention.

Now turning to FIG. 2, a block diagram of a signaling method for line terminal equipment health and status information in accordance with the present invention is shown.

As shown in FIG. 1, line terminal equipments 30 and 35 are shown coupled to high speed circuit interface 40 and to bearer payload processors 50-N. Only bearer payload processor 50 is shown in FIG. 2 for the sake of simplicity and for purposes of explanation only.

Line terminal equipment 30 transmits bearer payload stream or simply bearer traffic 62 on link 70 to BPP 50. Within bearer traffic 62 there are several bytes of health and status information pertaining to line terminal equipment 30. This health and status information 66 is for channel bank 1A which couples line terminal equipment 30 through digital cross connect switch 15 to the mobile switching center 10. These health and status bytes include APS K-bytes and are appended onto the stream of bearer traffic 62.

Similarly, for channel bank 1B bearer traffic stream 64 is transmitted on link 60 to bearer payload processor (BPP) 50. Bearer traffic stream 64 includes a number of bytes indicating the health and status of channel bank 1B and any associated APSK bytes 68. Bearer traffic stream 64 is also transmitted on link 60 to BPP 50. LTE 30 sends a bearer traffic stream to each BPP 50-N including the health and status information 66 and 68. This health and status information is part of the bearer traffic of payload 62 and 64 for each of the channel banks 1A and 1B associated with a particular LTE 30.

The health and status information 66 and 68 is collected and analyzed by each of the BPPs. BPP 50 then makes any adjustments necessary as a result of the health and status information 66 and 68. That is, if BPP 50 is informed that channel bank 1A is faulty, it immediately switches its transmission of bearer traffic to line terminal equipment 35 bank 2A.

In addition, each BPP 50 concatenates the health and status information of each of the banks of line terminal equipment 30, for example. BPP 50 then transmits the concatenated health and status information to LTEs 30 and 35. That is, BPP 50 transmits the concatenated health and status information 66 and 68 along with its bearer traffic as bearer traffic 72 and 74 on link 70. That is, each LTE 30 and 35 receives its own channel bank health and information status back along with the status of each of the other line terminal equipments. Similarly, BPP 50 transmits bearer traffic 70 and 72 along with health and status information 66 and 68 concatenated into the bearer traffic to LTE 35.

Each BPP 50-N effectively broadcasts the health and status information of each bank of line terminal equipment to each of the other line terminal equipments. This allows each LTE to be cognizant of every other LTE's health and status. Further, should one LTE fail, an LTE designated as a standby can take over active transmission of bearer traffic expeditiously.

Since each LTE is connected to a number of BPPs 50-N, the LTE receives redundant health and status information for each of the other LTEs. This redundant information however is provided over physically separate interfaces or links. As a result, the method for signaling health and status of line terminal equipment is particularly robust in view of failed OC3 fiber connections to the mobile switching center, failed line terminal equipment, failed high speed circuit interface, and failed bearer payload processors.

Similarly, each BPP 50-N transmits the concatenated health and status information 72 and 74 to all other LTEs 35 via links 70, 80, etc. for each connected LTE.

Figure 3:
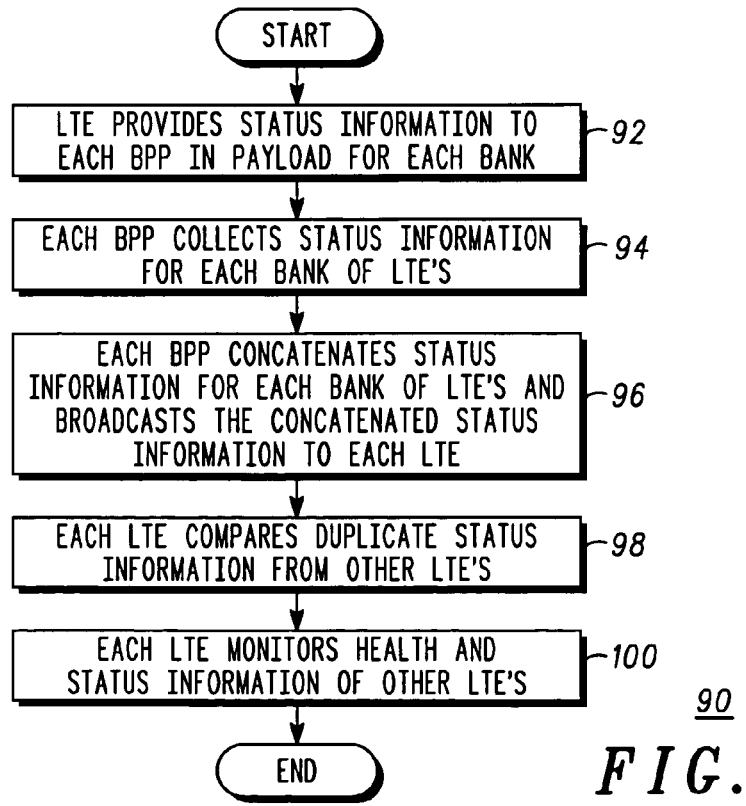
FIG. 3 is a flow chart of a signaling method in accordance with the present invention.

Referring to FIG. 3, a flow chart of a signaling method 90 is shown. Signaling method for line terminal equipment health and status information in accordance with the present invention is shown. The method is started and block 92 is entered. For each channel bank (1A, 1B) of an LTE 30, for example, the LTE provides status information 66 along with the bearer traffic 62 to each of the BPPs 50-N. Next, each BPP 50-N collects the status information 66 for channel 1A and 68 for channel bank 1B, for example. Each BPP then may examine the health and status information and determine whether the transmission of bearer traffic to the same LTE is warranted or whether that LTE has failed. If the LTE has failed, the BPP 50 may determine that LTE 35 should receive subsequent bearer traffic transmissions and instruct LTE 35 so as to recognize the input from BPP 50.

Next, each BPP 50 concatenates the health and status information for each channel bank of LTEs, block 96. That is, the BPP 50 produces the bearer traffic streams with the health and status of channel bank 1A 66 with the health and status of channel bank 1B 68 along with the bearer traffic to produce data stream 72 and 74. Then each BPP 50-N broadcasts the concatenated health and status information 72 and 74 to each line terminal equipment 30 and 35, block 96.

Since each BPP 50 receives the health and status information of each of the LTEs and relays the information to all connected LTES, over multiple independent physical paths, each LTE can vote on whether it should take over for a failed active LTE. Further, since each LTE receives redundant health and status information concerning each of the other LTEs, each LTE will be aware of when others are faulty and to switch over bearer traffic from one LTE to another, block 98. The process is then ended.

The method of broadcasting LTE health and status information from the LTE to the BPP and back to all other LTEs eliminates communication delays associated with fault detection and subsequent equipment switch over. This broadcast method may be applied to one-to-one or one-to-end parallel paths for improving signaling reliability and bit error rate performance. Each LTE may perform bit error rate analysis and integration via multiple physical paths in order to provide maximum communication reliability. When an LTE fault occurs each remaining LTE may rapidly utilize the bit error rate analysis in order to switch over bearer traffic from one LTE to another rapidly.

Although the preferred embodiment of the invention has been illustrated, and that form described in detail, it will be readily apparent to those skilled in the art that various modifications may be made therein without departing from the spirit of the present invention or from the scope of the appended claims.

What is claimed is:

1. A signaling method for line terminal equipment health and status information comprising the steps of:
    providing at least first and second line terminal equipment (LTEs);
    transmitting by said at least first and second line terminal equipment a health and status information to a plurality of bearer payload processors (BPPs);
    collecting by each of said plurality of BPPs the health and status information from the at least first and second LTEs;
    concatenating by each of the plurality of BPPs the health and status information of the at least first and second LTEs; and
    broadcasting by each of the plurality of BPPs the concatenated health and status information to each of the at least first and second LTEs.

2. The signaling method as claimed in claim 1, wherein there is further included a step of comparing by each of the plurality of BPPs the concatenated health and status information of the at least first and second LTEs.

3. The signaling method as claimed in claim 1, wherein there is further included a step of comparing by each LTE the concatenated health and status information of the at least first and second LTEs.

4. The signaling method as claimed in claim 1, wherein the step of transmitting by said at least first and second line terminal equipment the health and status information includes a step of transmitting the health and status information included with bearer traffic.

5. A signaling method for line terminal equipment health and status information comprising the steps of:
   providing at least first and second line terminal equipment (LTEs);
   receiving by a plurality of bearer payload processors (BPPs) health and status information of the at least first and second line terminal equipment;
   concatenating by each of the plurality of BPPs the health and status information of the at least first and second LTEs; and
   broadcasting by each of the plurality of BPPs the concatenated health and status information to each of the at least first and second LTEs.

6. The signaling method as claimed in claim 5, wherein there is further included a step of comparing by each of the plurality of BPPs the concatenated health and status information of the at least first and second LTEs.

7. The signaling method as claimed in claim 5, wherein there is further included a step of comparing by each LTE the concatenated health and status information of the at least first and second LTEs.

8. A signaling method for line terminal equipment health and status information comprising the steps of:
   providing at least first and second line terminal equipment (LTEs);
   receiving by a plurality of bearer payload processors (BPPs) health and status information of the at least first and second line terminal equipment;
   comparing by each of the plurality of BPPs the health and status information received from the at least first and second LTEs;
   concatenating by each of the plurality of BPPs the health and status information of the at least first and second LTEs; and
   broadcasting by each of the plurality of BPPs the concatenated health and status information to each of the at least first and second LTEs.

9. The signaling method as claimed in claim 8, wherein the step of broadcasting further includes a step of transmitting the concatenated health and status information of the at least first and second LTEs included with bearer traffic.

10. The signaling method as claimed in claim 8, wherein there is further included a step of comparing by each LTE the health and status information of the at least first and second LTEs.

* * * * *